June 5, 1928. 1,672,224
F. X. LAUTERBUR
BEATER
Filed May 14, 1926
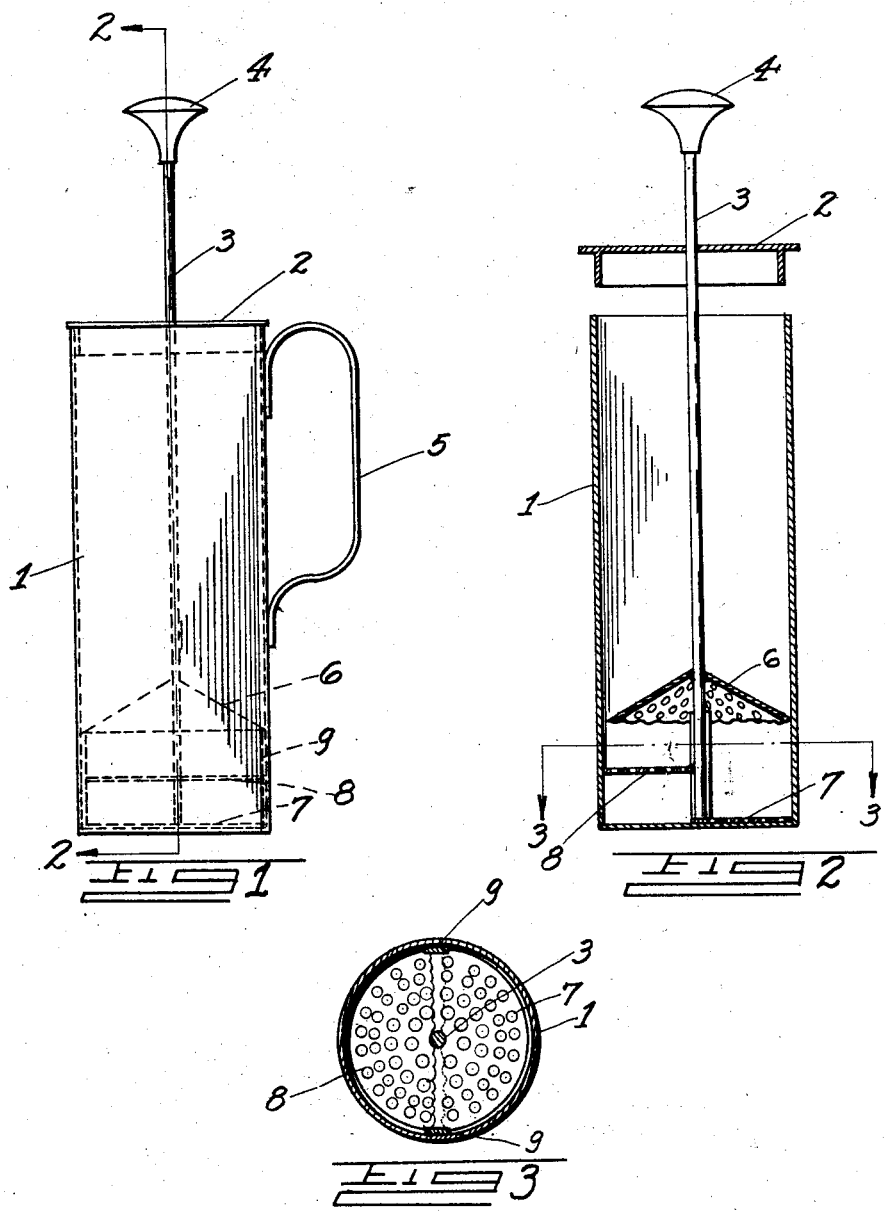
INVENTOR.
Frank X. Lauterbur
BY
ATTORNEYS Patented June 5, 1928.

1,672,224

UNITED STATES PATENT OFFICE.

FRANK X. LAUTERBUR, OF SIDNEY, OHIO.

BEATER.

Application filed May 14, 1926. Serial No. 109,148.

My invention relates broadly to the general class of mixers, agitators, and beaters such as are required in the manufacture of confections and baked goods. Specifically, my invention relates to manually operable beaters, such as are adapted to beat the whites or yolks of eggs, to whip cream, to make meringues and to perform other similar processes which require the production of a highly atomized and aerated product.

It is the object of my invention to provide a beater which will be very effective in its operation, and which will further be so constructed as to provide a convenient means of removal of the beaten product from the container in which the beater is operable.

The principle involved in my construction is not readily explained, as the course of the beaten material cannot be accurately traced within the receptacle for the beater. The results obtained, however, are very satisfactory. In whipping cream and making mayonnaise dressing, processes which frequently turn out badly due to the failure of the oil to properly emulsify, or due to the cream going to butter instead of whipping, my beater is particularly efficient in avoiding occasional spoiled batches.

Referring to the drawings in which I have illustrated a preferred modification:

Figure 1 is a side elevation of the beater mounted in a cylindrical container.

Figure 2 is a vertical section through the receptacle as indicated by the lines 2—2 in Figure 1, showing the structure of the beater mechanism.

Figure 3 is a horizontal section taken along the lines 3—3 in Figure 2.

The preferred type of container for the beater is indicated at 1, being composed of a hollow cylindrical vessel with a cover 2, through which the shaft 3 of the beater protrudes. The shaft in the illustration has a handle 4, with which the shaft may be reciprocated within the cylinder. The cylinder is also shown with a handle 5, although the handle of the cylinder and the shape or size of the cylinder forms no part of my invention.

On the shaft 3 I have provided a conical foraminated plate 6, which is preferably mounted on the shaft in interspaced position, both from the end of the shaft and from the portion of the shaft which slides through the cover. The top of the conical plate may be used as a stop, to limit the outward reciprocating stroke of the shaft. On the inner end of the shaft, a semicircular foraminated plate 7 is mounted and interspaced from the end plate 7; another foraminated plate 8 is mounted, which is preferably mounted as indicated in Figures 2 and 3, so that the upper semicircular plate completes the circle of which the lower plate forms one half, as considered from a longitudinal view within the container. The formaniated plates, the arrangement of which forms the basis of my invention, apparently cause just enough of a transverse flow of material through the lateral interspaced area between the plates to prevent a tendency of the liquid being beaten to grain out or separate during the beating operation. The foraminated plates may have any suitable arrangement of apertures, or the plates may be made of suitable mesh screening. In the illustration, the two foraminated plates are braced with vertical side tie plates 9, which secure the outer peripheries of the two plates together and form a more rigid structure than would otherwise result if both plates were mounted solely on the shaft. The mounting arrangement may be varied by other suitable mechanical modifications, with or without tie plates.

An important feature of my invention is that in withdrawing the beaten material from the container, the two semicircular plates will assist in the discharge. By turning the shaft slightly during the final stroke in which the beater mechanism is lowered within the receptacle, the two semicircular plates will cut sideways through the beaten material and so descend to the bottom without disturbing the structure of the material. By pulling outwardly without rotating the shaft, the beaten material will be carried out with the beater, and what adheres between the foraminated plates may be shaken off with a gentle lateral tapping movement.

Modifications in structure which relate to the change of the shape of the container or of the size of the parts such as would be required in a larger type of mechanical beater, I consider within the scope of my invention. I further contemplate the use of three or more interspaced plates of less than semicircular shape, the principle involved being the interspacing of plates so as to cause lateral currents between the interspaced areas.

Having thus described my invention what I claim as new and desire to secure by Letters Patent is:—

1. In a beater adapted to agitate material within a container, a shaft for carrying the agitating means, a conical foraminated element mounted between the ends of the shaft, a semicircular foraminated element fixedly mounted adjacent the end of said shaft, and another semicircular foraminated element fixedly mounted on said shaft and substantially interspaced from the second mentioned foraminated element, so as to provide a lateral opening of equivalent length as the diameters of the semicircular elements between the second and last mentioned foraminated plates for creating a transverse flow of material during agitation.

2. In a beater adapted to agitate material within a container, a shaft for carrying the agitating means, a conical foraminated element mounted between the ends of the shaft, a semicircular foraminated element adjacent the end of said shaft, and another semicircular foraminated element mounted on said shaft and interspaced from the second mentioned foraminated element, thereby providing a lateral opening, said semicircular foraminated plates forming approximately a completely circular agitating means.

3. In combination with a conical foraminated agitating element, semicircular foraminated elements mounted in interspaced relation so as to create transverse currents between said foraminated plates, and the conical foraminated element supported in position to retard said transverse currents, and a shaft on which said semicircular elements are fixedly mounted.

4. Agitating means comprising a series of approximately flat segmental plates, carried in substantially interspaced relation each to the other, a reciprocable shaft on which said plates are fixedly mounted, and said segmental plates of such shape as to make up together a complete circle, and said plates having apertures for allowing material to be agitated to be finely divided in passing therethrough.

FRANK X. LAUTERBUR.